(12) United States Patent
Lai et al.

(10) Patent No.: US 11,072,078 B2
(45) Date of Patent: Jul. 27, 2021

(54) METHOD FOR MEASURING POSE OF ROBOTIC END TOOL

(71) Applicant: YUANMENG PRECISION TECHNOLOGY (SHENZHEN) INSTITUTE, Shenzhen (CN)

(72) Inventors: Yongfei Lai, Shenzhen (CN); Yan Nie, Shenzhen (CN); Junqi Li, Shenzhen (CN); Qing Liu, Shenzhen (CN)

(73) Assignee: YUANMENG PRECISION TECHNOLOGY (SHENZHEN) INSTITUTE, Shenzhen (CN)

( * ) Notice: Subject to any disclaimer, the term of this patent is extended or adjusted under 35 U.S.C. 154(b) by 572 days.

(21) Appl. No.: 16/074,916

(22) PCT Filed: Oct. 19, 2017

(86) PCT No.: PCT/CN2017/106889
§ 371 (c)(1),
(2) Date: Aug. 2, 2018

(87) PCT Pub. No.: WO2019/019432
PCT Pub. Date: Jan. 31, 2019

(65) Prior Publication Data
US 2021/0197396 A1 Jul. 1, 2021

(30) Foreign Application Priority Data
Jul. 28, 2017 (CN) .......................... 201710631298.X

(51) Int. Cl.
*B25J 15/00* (2006.01)
*B25J 13/08* (2006.01)
(Continued)

(52) U.S. Cl.
CPC ............. *B25J 13/089* (2013.01); *B25J 9/023* (2013.01); *B25J 9/1697* (2013.01); *B25J 11/0055* (2013.01)

(58) Field of Classification Search
CPC . B25J 13/00; B25J 13/089; B25J 9/023; B25J 9/1697; B25J 9/1692; B25J 9/1664;
(Continued)

(56) References Cited

U.S. PATENT DOCUMENTS

| 5,020,001 A | 5/1991 | Yamamoto et al. |
| 7,287,939 B2 * | 10/2007 | Koch ................. G05B 19/4099 409/132 |
| 7,965,055 B2 * | 6/2011 | Koike .................. B23K 9/1272 318/568.18 |
| 2018/0207797 A1 * | 7/2018 | Yamaoka ................. B25J 9/163 |

(Continued)

FOREIGN PATENT DOCUMENTS

| CN | 102689118 A | 9/2012 |
| CN | 103101060 A | 5/2013 |

(Continued)

OTHER PUBLICATIONS

International Search Report and Written Opinion of the International Search Authority dated Apr. 28, 2018 of corresponding International application No. PCT/CN2017/106889; 9 pgs.
(Continued)

*Primary Examiner* — Dalena Tran
(74) *Attorney, Agent, or Firm* — Maier & Maier, PLLC

(57) ABSTRACT

A method for measuring a pose of a robotic end tool, including: obtaining a three-dimensional feature of a flange and a three-dimensional feature of the end tool, establishing a first coordinate system and a second coordinate system at the center of the flange and the center of the end tool respectively, calculating a positional offset of the second coordinate system relative to the first coordinate system, and calculating a rotation offset of the second coordinate system relative to the first coordinate system according to each unit
(Continued)

vector of the second coordinate system, so as to obtain a pose of the end tool relative to the flange. The method provided in the present application, compared with the manual observation method, the precision and stability of the pose measurement method are high.

6 Claims, 2 Drawing Sheets

(51) Int. Cl.
*B25J 9/16* (2006.01)
*B25J 9/02* (2006.01)
*B25J 11/00* (2006.01)

(58) Field of Classification Search
CPC .... B25J 11/0055; Y10S 901/41; Y10S 901/02
USPC ........ 700/245; 318/560, 567, 568.15, 568.22
See application file for complete search history.

(56) References Cited

U.S. PATENT DOCUMENTS

| | | | |
|---|---|---|---|
| 2018/0222056 A1* | 8/2018 | Suzuki | B25J 15/009 |
| 2018/0257230 A1* | 9/2018 | Kinoshita | B25J 11/0055 |

FOREIGN PATENT DOCUMENTS

| | | |
|---|---|---|
| CN | 104227250 A | 12/2014 |
| CN | 105014679 A | 11/2015 |
| CN | 105345453 A | 2/2016 |
| CN | 105509671 A | 4/2016 |
| CN | 105716525 A | 6/2016 |
| JP | H02-82302 A | 4/2016 |
| KR | 2005-0001608 A | 1/2005 |
| RU | 2 466 858 C1 | 11/2012 |

OTHER PUBLICATIONS

Office Action dated Feb. 2, 2019 in corresponding Chinese Application No. 201710631298.X; 15 pages.

* cited by examiner

METHOD FOR MEASURING POSE OF ROBOTIC END TOOL

FIELD

The present application relates to the field of industrial robots, and more particularly relates to a method for measuring a pose of a robotic end tool.

BACKGROUND

With the development of high-end manufacturing, the requirement of machining precision of industrial robots is getting higher and higher. When using industrial robots to machine corresponding products, it is necessary to place machining tools such as welding guns and cutters at the end of the industrial robot. The precision of pose calibration of a tool center point directly affects the machining precision of the industrial robot. Herein, the pose refers to the position and posture of the end tool of the industrial robot in a specified coordinate system.

After the industrial robot is replaced with a new tool or after a long period of operation, a certain deviation of the center point of the tool will occur, resulting in a lowered machining precision of the robot. Therefore, it is necessary to measure the center point of the robotic end tool and perform deviation compensation. At present, for the measurement of the center point pose of the robotic end tool, the method of manual observation is usually adopted, and the multi-pose is approached to affixed point to realize the measurement of the center point pose of the end tool. However, this method relies on manual movement and visual observation, and its precision and stability are low.

SUMMARY

An object of the present application is to provide a method for measuring the pose of a robotic end tool, in order to solve the technical problem that the center point pose measurement of the robotic end tool in the prior art is low in precision and stability caused by the manual method.

The present application provides a method for measuring a pose of a robotic end tool, comprising the following steps:

obtaining a three-dimensional feature of a flange for clamping the end tool and a three-dimensional feature of the end tool;

determining a center of the flange according to the three-dimensional feature of the flange, determining a center of the end tool according to the three-dimensional feature of the end tool;

establishing a first coordinate system and a second coordinate system based on the center of the flange and the center of the end tool respectively;

calculating a positional offset of an origin of the second coordinate system relative to an origin of the first coordinate system;

calculating in the first coordinate system, a unit vector of a positive direction of the X-axis of the second coordinate system, a unit vector of a positive direction of the Y-axis, and a unit vector of a positive direction of the Z-axis in the first coordinate system, calculating a unit vector of a positive direction of the X-axis, a unit vector of a positive direction of the Y-axis, and a unit vector of a positive direction of the Z-axis of the second coordinate system; and forming a posture transformation matrix of the second coordinate system by the unit vector of the positive direction of the X-axis, the unit vector of the positive direction of the Y-axis, and the unit vector of the positive direction of the Z-axis of the second coordinate system in commonly form a posture transformation matrix of the second coordinate system, and calculating a rotation offset of the second coordinate system relative to the first coordinate system by the posture transformation matrix.

Further, the specific steps of calculating the positional offset of the origin of the second coordinate system relative to the origin of the first coordinate system comprising:

The origin of the first coordinate system is defined as $0_1$, the origin of the second coordinate system is defined as $0_2$, and the coordinate value of $0_1$ in the first coordinate system is defined as $(0, 0, 0)$, and the coordinate value of $0_2$ in the first coordinate system is defined as $(x_0, y_0, z_0)$;

Calculating the positional offset as $\Delta x = x_0$, $\Delta y = y_0$, $\Delta z = z_0$: wherein the $\Delta x$ is the positional offset of the second coordinate system relative to the first coordinate system in the X direction, the $\Delta y$ is the positional offset of the second coordinate system relative to the first coordinate system in the Y direction, and the $\Delta z$ is the positional offset of the second coordinate system relative to the first coordinate system in the Z direction.

Further, the step that in the first coordinate system, calculating a unit vector of a positive direction of the X-axis of the second coordinate system, a unit vector of a positive direction of the Y-axis, and a unit vector of a positive direction of the Z-axis specifically comprising:

taking Points $P_1$ and $P_2$ on the X-axis and the Y-axis of the second coordinate system respectively, and the coordinate values of $P_1$ and $P_2$ in the first coordinate system are defined as $(x_1, y_1, z_1)$ and $(x_2, y_2, z_2)$ respectively;

calculating the vector $\overrightarrow{O_2P_1} = (x_1-x_0, y_1-y_0, z_1-z_0)$, and calculating the vector $\overrightarrow{O_2P_2} = (x_2-x_0, y_2-y_0, z_2-z_0)$;

calculating a unit vector $\vec{X}$ of the $\overrightarrow{O_2P_1}$ as $$\left( \frac{x_1 - x_0}{\sqrt{(x_1-x_0)^2 + (y_1-y_0)^2 + (z_1-z_0)^2}}, \right.$$

$$\frac{y_1 - y_0}{\sqrt{(x_1-x_0)^2 + (y_1-y_0)^2 + (z_1-z_0)^2}},$$

$$\left. \frac{z_1 - z_0}{\sqrt{(x_1-x_0)^2 + (y_1-y_0)^2 + (z_1-z_0)^2}} \right)$$

wherein the $\vec{X}$ is a unit vector of the second coordinate system in the positive direction of the X-axis;

calculating a unit vector $\vec{Y}$ of the $\overrightarrow{O_2P_2}$ as $$\left( \frac{x_2 - x_0}{\sqrt{(x_2-x_0)^2 + (y_2-y_0)^2 + (z_2-z_0)^2}}, \right.$$

$$\frac{y_2 - y_0}{\sqrt{(x_2-x_0)^2 + (y_2-y_0)^2 + (z_1-z_0)^2}},$$

$$\left. \frac{z_2 - z_0}{\sqrt{(x_1-x_0)^2 + (y_1-y_0)^2 + (z_2-z_0)^2}} \right)$$

wherein the $\vec{Y}$ is a unit vector of the second coordinate system in the positive direction of the Y-axis;

calculating a unit vector $\vec{Z}$ of the second coordinate system in the positive direction of the Z-axis as $\vec{X} \times \vec{Y}$.

Further, supposing the unit vector of the positive direction of the X-axis of the second coordinate system is $(a_1, b_1, c_1)$, and the unit vector of the positive direction of the Y-axis of the second coordinate system is $(a_2, b_2, c_2)$, the unit vector of the positive direction of the Z-axis of the second coordinate system is $(a_3, b_3, c_3)$, and the posture transformation matrix is calculated as $$\begin{bmatrix} a_1 & a_2 & a_3 \\ b_1 & b_2 & b_3 \\ c_1 & c_2 & c_3 \end{bmatrix}.$$

Further, the rotation offset are defined as $$R_x = \tan^{-1} \frac{b_1}{a_1}, R_y = \tan^{-1} \frac{-c_1}{\sqrt{a_1^2 + b_1^2}},$$

$$R_z = \tan^{-1} \frac{c_2}{c_3},$$

wherein the $R_x$ is a rotational offset of the second coordinate system relative to the first coordinate system on the X-axis, and the $R_y$ is a rotational offset of the second coordinate system relative to the first coordinate system on the Y-axis, the $R_z$ is a rotational offset of the second coordinate system relative to the first coordinate system on the Z-axis.

Further, obtaining the three-dimensional features of the flange and the end tool by a binocular three-dimensional scanner.

The beneficial effect of the method for measuring the pose of the robotic end tool provided by the present application is summarized as follows: comparing to the prior art, the method for measuring the pose of the robotic end tool of the present application establishes a first coordinate system and a second coordinate system at the center of the flange and the center of the end tool respectively, calculates a positional offset of the origin of the second coordinate system relative to the origin of the first coordinate system, and calculates a rotational offset of the second coordinate system relative to the first coordinate system by the posture transformation matrix of the second coordinate system, therefore obtains the pose of the end tool relative to the flange. The method for measuring the pose obtains the pose of the end tool by calculating the relative position and relative posture of the end tool and the flange, and compared with the manual observation method, the precision and stability of the pose measurement method are high.

BRIEF DESCRIPTION OF THE DRAWINGS

In order to make the technical solutions in the embodiments of the present application clearer, the accompanying drawings to be used in the embodiments and the description of the prior art will be briefly introduced below, it is apparent that the drawings in the following description are merely some embodiments of the present application and that other drawings may be obtained by those skilled in the field without departing from the inventive nature of the application.

Figure 1:
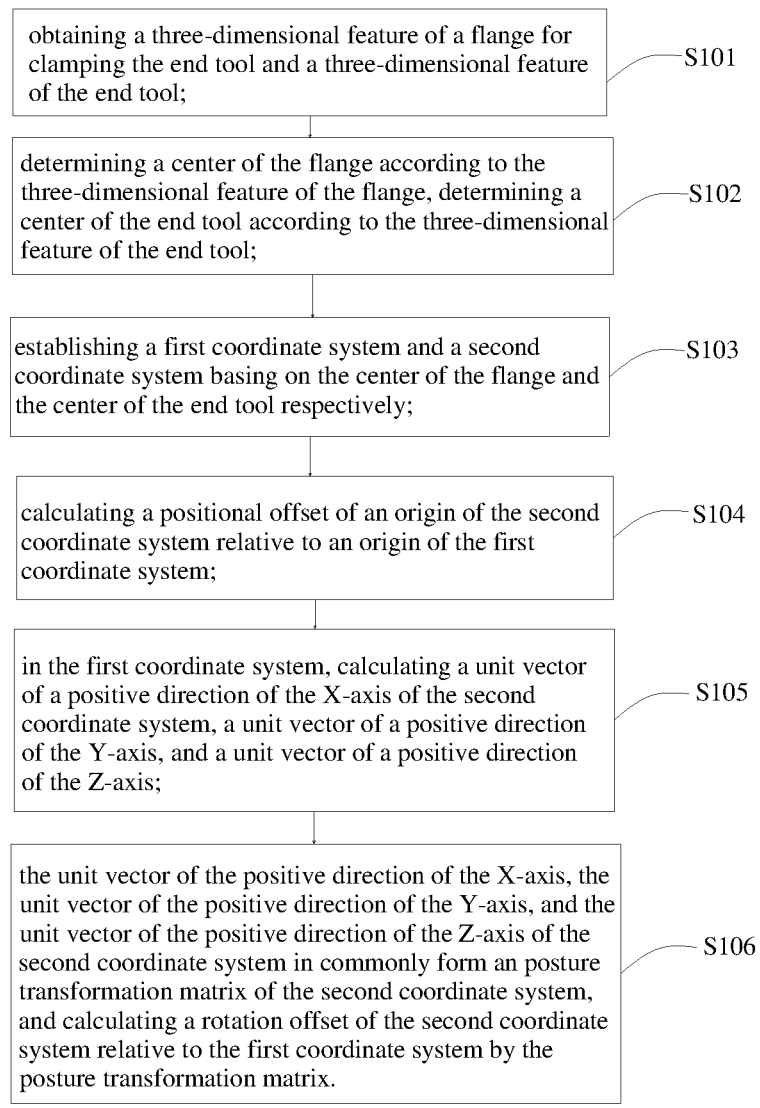
FIG. 1 is a flowchart of implement of a method for measuring the pose of a robotic end tool according to an embodiment of the present application.

In the drawings, the following reference numerals are used:
 1—binocular three-dimensional scanner; 2—robot; 21—flange; 210—first coordinate system; 22—end tool; and 220—second coordinate system.

DETAILED DESCRIPTION

In order to make the technical problems to be solved, technical solutions, and beneficial effects of the present application clearer and more understandable, the present application will be further described in detail hereinafter with reference to the accompanying drawings and embodiments. It should be understood that the embodiments described herein are only intended to illustrate but not to limit the present application.

It should be noted that when a component is referred to as being "fixed to" or "disposed on" another component, it can be directly or indirectly on another component. When a component is referred to as being "connected to" another component, it can be directly or indirectly connected to another component.

It should be understood that, "length", "width", "upper", "lower", "front", "back", "left" and "right", "vertical", "horizontal", "top", "bottom", "inside", "outside" and other terms indicating the orientation or positional relationship are based on orientation or positional relationship shown in the drawings, and are only for the purpose of facilitating the description of the application and simplifying the description, instead of indicating or implying that the indicated device or component must have a specific orientation and constructed and operated in a particular orientation, and therefore it cannot be construed as limitation of the application.

In addition, the terms "first" and "second" are for illustrative purposes only and should not be construed as indicating or implying a relative importance or implicitly indicating the quantity of technical features indicated. Therefore, a feature that defines "first" and "second" may expressly or implicitly include one or more of the features. In the description of the present application, "multiple" means two or more than two, unless otherwise specifically defined.

Figure 2:
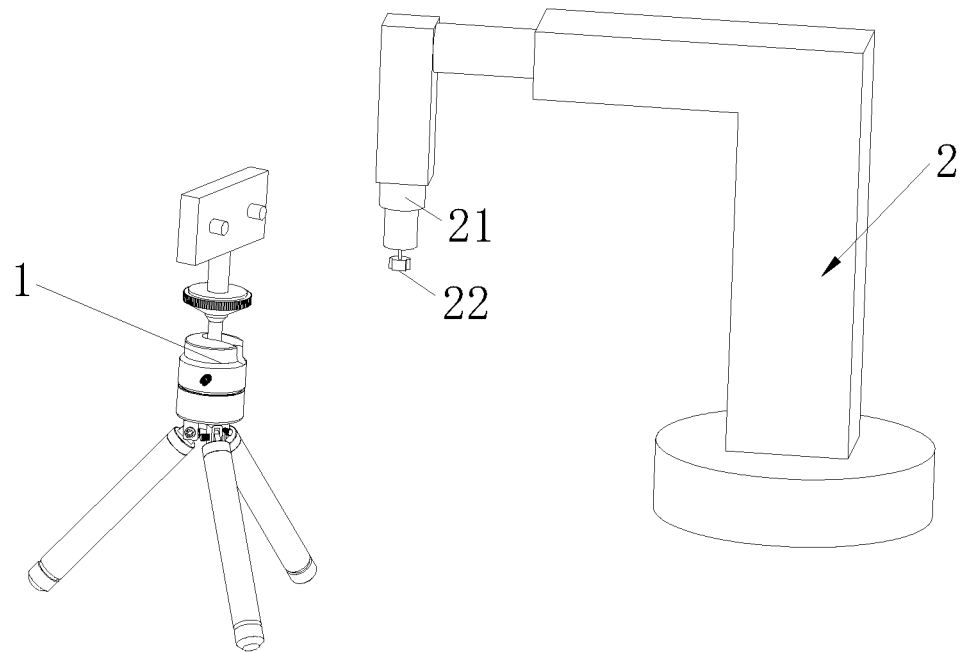
FIG. 2 is a schematic diagram of a method for measuring the pose of a robotic end too according to an embodiment of the present application.

Please refer to FIG. 1 and FIG. 2, the method for measuring the pose of the robotic end tool provided by the present application will now be described. The robot 2 includes a robot arm, a flange 21 fixed to the robot arm, and an end tool 22 clamped at the flange 21, and the end tool 22 comprises a welding gun, a cutter, and the like. The pose of the robotic end tool refers to the position and posture of the end tool 22 in the specified coordinate system, and the position and posture of the end tool 22 can be used to represent as the position offset and the rotational offset of the end tool 22 relative to the specified coordinate system respectively. The method for measuring the pose comprises the following steps:

Step S101, which is specifically as follows:

a three-dimensional feature of the flange 21 for clamping the end tool 22 and a three-dimensional feature of the end tool 22 are obtained, that is, by obtaining an external contour lattice of the flange 21 and the end tool 22, the external contour lattice of the flange 21 are combined to form the three-dimensional feature of the flange 21, the external contour lattices of the end tool 22 are combined to form a three-dimensional feature of the end tool 22.

Further, in step S101, the three-dimensional feature of the flange 21 and the end tool 22 are obtained by the binocular three-dimensional scanner 1. When the binocular three-dimensional scanner 1 is used, the binocular three-dimensional scanner 1 is placed in the vicinity of the robotic end tool 22, and the external contour features of the end tool 22 and the flange 21 are scanned to obtain the external contour lattice of the end tool 22 and the flange 21, then upload the data of the external contour lattice to a reverse engineering software, the unneeded data are deleted using the reverse engineering software, and then the line fitting and surface fitting of the remaining lattice data are performed, and finally the three-dimensional feature is formed through the fitted line and surface.

Step S102, which is specifically as follows:

a center of the flange 21 is determined according to the three-dimensional feature of the flange 21, a center of the end tool 22 is determined according to the three-dimensional feature of the end tool 22. When determining the center of the flange 21 and the center of the end tool 22, the external contour lattices are firstly processed by reverse engineering software such as Germanic, Image ware or the like, the unnecessary lattice data are deleted, and then line fitting and surface fitting of the remaining lattice data are performed, and finally the center of the end tools 22 and the center of the flange 21 are determined through the fitted line and surface.

Step S103, which is specifically as follows:

a first coordinate system 210 and a second coordinate system 220 are established based on the center of the flange 21 and the center of the end tool 22 respectively, and the first coordinate system 210 and the second coordinate system 220 are Cartesian rectangular coordinate systems including mutually perpendicular X-axis, Y-axis and Z-axis;

Step S104, which is specifically as follows:

a positional offset of an origin of the second coordinate system 220 relative to an origin of the first coordinate system 210 is calculated, herein, the positional offset refers to positional offsets of the origin of the second coordinate system 220 relative to the origin of the first coordinate system 210 on the X-axis, the Y-axis, and the Z-axis, respectively.

Figure 3:
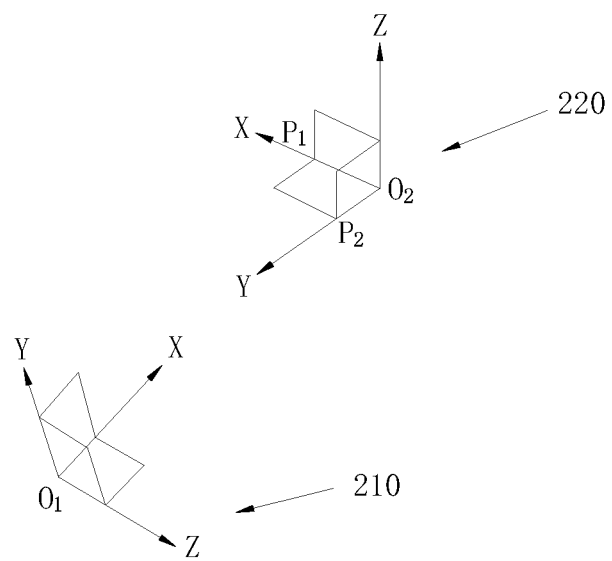
FIG. 3 is a schematic diagram of a first coordinate system and a second coordinate system used in the embodiment of the present application.

Further, in step S104, as shown in FIG. 3, the origin of the first coordinate system 210 is defined as $O_1$, the origin of the second coordinate system 220 is defined as $O_2$, the coordinate value of $O_1$ in the first coordinate system 210 is defined as (0, 0, 0), and the coordinate value of $O_2$ in the first coordinate system 210 is defined as $(x_0, y_0, z_0)$, the positional offset of the origin of the second coordinate system 220 relative to the origin of the first coordinate system 210 is defined as $(\Delta x, \Delta y, \Delta z)$, wherein the $\Delta x$ is the positional offset of the second coordinate system 220 relative to the first coordinate system 210 in the X direction, the $\Delta y$ is the positional offset of the second coordinate system 220 relative to the first coordinate system 210 in the Y direction, and the $\Delta z$ is the positional offset of the second coordinate system 220 relative to the first coordinate system 210 in the Z direction. So that $\Delta x = x_0 - 0 = x_0$, $\Delta y = y_0 - 0 = y_0$, $\Delta z = z_0 - 0 = z_0$, it can be concluded that the positional offset of the end tool 22 relative to the flange 21 is $(x_0, y_0, z_0)$.

Step S105, which is specifically as follows:

In the first coordinate system 210, a unit vector of the positive direction of the X-axis of the second coordinate system 220, a unit vector of the positive direction of the Y-axis, and a unit vector of the positive direction of the Z-axis are calculated, the first coordinate system 210 is used as a reference coordinate system, and the straight lines of the X-axis, the Y-axis, and the Z-axis of the second coordinate system 220 all have a certain direction. The respective directions of the X-axis, the Y-axis, and the Z-axis of the second coordinate system 220 can be represented by direction vectors, and the unit vectors of the X-axis, the Y-axis, and the Z-axis can be obtained by dividing each direction vector by the respective modular length.

Further, in step S105, please refer to FIG. 3, points $P_1$ and $P_2$ are respectively taken from the X-axis and the Y-axis of the second coordinate system 220 respectively, and the coordinate values of $P_1$ and $P_2$ in the first coordinate system 210 are defined as $(x_1, y_1, z_1)$ and $(x_2, y_2, z_2)$ respectively; $P_1$ and $P_2$ are any points on the X-axis and the Y-axis respectively; the vector direction of the directed line segment $O_2P_1$ is the same as the vector direction of the positive direction of the X-axis of the second coordinate system 220, and the vector direction of the directed line segment $O_2P_2$ is the same as the vector direction of the positive direction of the Y-axis of the second coordinate system 220, So calculating the vector $\overrightarrow{O_2P_1} = (x_1 - x_0, y_1 - y_0, z_1 - z_0)$, the vector $\overrightarrow{O_2P_2} = (x_2 - x_0, y_2 - y_0, z_2 - z_0)$; and a unit vector $\vec{X}$ of the $\overrightarrow{O_2P_1}$ as $$\vec{X} = \left( \frac{x_1 - x_0}{\sqrt{(x_1 - x_0)^2 + (y_1 - y_0)^2 + (z_1 - z_0)^2}}, \right.$$

$$\frac{y_1 - y_0}{\sqrt{(x_1 - x_0)^2 + (y_1 - y_0)^2 + (z_1 - z_0)^2}},$$

$$\left. \frac{z_1 - z_0}{\sqrt{(x_1 - x_0)^2 + (y_1 - y_0)^2 + (z_1 - z_0)^2}} \right)$$

a unit vector $\vec{Y}$ of the $\overrightarrow{O_2P_2}$ as $$\vec{Y} = \left( \frac{x_2 - x_0}{\sqrt{(x_2 - x_0)^2 + (y_2 - y_0)^2 + (z_2 - z_0)^2}}, \right.$$

$$\frac{y_2 - y_0}{\sqrt{(x_2 - x_0)^2 + (y_2 - y_0)^2 + (z_2 - z_0)^2}},$$

$$\left. \frac{z_2 - z_0}{\sqrt{(x_2 - x_0)^2 + (y_2 - y_0)^2 + (z_2 - z_0)^2}} \right)$$

wherein the $\vec{X}$ is the unit vector of the second coordinate system 220 in the positive direction of the X-axis, the $\vec{Y}$ is the unit vector of the second coordinate system 220 in the positive direction of the Y-axis; the unit vector $\vec{X}$ and the unit vector $\vec{Y}$ are perpendicular to each other, according to the expressions of the $\vec{X}$ vector and the $\vec{Y}$ vector, a $\vec{Z}$ vector perpendicular to the plane in which the $\vec{X}$ vector and the $\vec{Y}$ vector are located can be calculated, and the $\vec{Z}$ vector is a unit vector in the positive direction of the Z-axis in the second coordinate system 220, supposing $\vec{X}=(a_1,b_1,c_1)$, $Y=(a_2,b_2,c_2)$, wherein:

$$a_1 = \frac{x_1 - x_0}{\sqrt{(x_1 - x_0)^2 + (y_1 - y_0)^2 + (z_1 - z_0)^2}},$$

$$b_1 = \frac{y_1 - y_0}{\sqrt{(x_1 - x_0)^2 + (y_1 - y_0)^2 + (z_1 - z_0)^2}},$$

$$c_1 = \frac{z_1 - z_0}{\sqrt{(x_1 - x_0)^2 + (y_1 - y_0)^2 + (z_1 - z_0)^2}},$$

$$a_2 = \frac{x_2 - x_0}{\sqrt{(x_2 - x_0)^2 + (y_2 - y_0)^2 + (z_2 - z_0)^2}},$$

$$b_2 = \frac{y_2 - y_0}{\sqrt{(x_2 - x_0)^2 + (y_2 - y_0)^2 + (z_2 - z_0)^2}},$$

$$c_2 = \frac{z_2 - z_0}{\sqrt{(x_2 - x_0)^2 + (y_2 - y_0)^2 + (z_2 - z_0)^2}},$$

so $\vec{Z}=\vec{X}\times\vec{Y}=(b_1c_2-b_2c_1, a_1c_2-a_2c_1, a_1b_2-a_2b_1)$, according to the above steps, the unit vector of the X-axis positive direction, the Y-axis positive direction, and the Z-axis positive direction in the second coordinate system 220 can be obtained.

Step S106 specifically is:

The unit vector of the positive direction of the X-axis, the unit vector of the positive direction of the Y-axis, and the unit vector of the positive direction of the Z-axis of the second coordinate system 220 together form a posture transformation matrix of the second coordinate system 220, and a rotation offset of the second coordinate system 220 relative to the first coordinate system 210 is calculated by the posture transformation matrix.

Further, in step S106, the unit vector of the positive direction of the X-axis of the second coordinate system 220 is defined as $\vec{X}=(a_1,b_1,c_1)$, and the unit vector of the positive direction of the Y-axis of the second coordinate system 220 is defined as $Y=(a_2,b_2,c_2)$, the unit vector of the positive direction of the Z-axis of the second coordinate system 220 is defined as $\vec{Z}=(a_3,b_3,c_3)$, wherein $a_3=b_1c_2-b_2c_1$, $b_3=a_1c_2-a_2c_1$, $c_3=a_1b_2-a_2b_1$, and the posture transformation matrix is calculated as $$\begin{bmatrix} a_1 & a_2 & a_3 \\ b_1 & b_2 & b_3 \\ c_1 & c_2 & c_3 \end{bmatrix} = \begin{bmatrix} a_1 & a_2 & b_1c_2-b_2c_1 \\ b_1 & b_2 & a_1c_2-a_2c_1 \\ c_1 & c_2 & a_1b_2-a_2b_1 \end{bmatrix},$$

the posture transformation matrix may represent the posture transformation of the second coordinate system 220 relative to the first coordinate system 210, that is, the posture transformation of the end tool 22 relative to the flange 21 may be indicated.

Further, in step S106, according to the posture transformation matrix can obtain, the rotation offset of the second coordinate system 220 relative to the first coordinate system 210, the rotation offset are $$R_x = \tan^{-1}\frac{b_1}{a_1}, R_y = \tan^{-1}\frac{-c_1}{\sqrt{a_1^2 + b_1^2}}, R_z = \tan^{-1}\frac{c_2}{c_3},$$

wherein the $R_x$ is a rotational offset of the second coordinate system 220 relative to the first coordinate system 210 on the X-axis, and the $R_y$ is a rotational offset of the second coordinate system 220 relative to the first coordinate system 210 on the Y-axis, the $R_z$ is a rotational offset of the second coordinate system 220 relative to the first coordinate system 210 on the Z-axis, and then substituting $a_3=b_1c_2-b_2c_1$, $b_3=a_1c_2-a_2c_1$, $c_3=a_1b_2-a_2b_1$ into the expression of the rotation offset, which can obtain $$R_x = \tan^{-1}\frac{b_1}{a_1}, R_y = \tan^{-1}\frac{-c_1}{\sqrt{a_1^2 + b_1^2}}, R_z = \tan^{-1}\frac{c_2}{a_1b_2 - a_2b_1},$$

wherein $a_1$, $b_1$, $c_1$, $a_2$, $b_2$, $c_2$ are obtained when solving the unit vector of the positive direction of the X-axis and the positive direction of the Y-axis in the second coordinate system 220, and substituting the value of $a_1$, $b_1$, $c_1$, $a_2$, $b_2$ and $c_2$ into the expression of the rotation offset defined as get the result of the final rotation offset.

The method for measuring the pose of the robotic end tool provided by the present application, the method establishes a first coordinate system 210 and a second coordinate system 220 at the center of the flange 21 and the center of the end tool 22 respectively, calculates a positional offset of the origin of the second coordinate system 220 relative to the origin of the first coordinate system 210, and calculates a rotational offset of the second coordinate system 220 relative to the first coordinate system 210 by the posture transformation matrix of the second coordinate system 220, therefore obtains the pose of the end tool 22 relative to the flange 21, the method for measuring the pose obtains the pose of the end tool 22 by calculating the relative position and relative posture of the end tool 22 and the flange 21, and the precision and stability of the pose measurement method are high.

It's obvious that the aforementioned embodiments are only preferred embodiments of the present application, and are not intended to limit the present application. Any modification, equivalent replacement, improvement, and so on, which are made within the spirit and the principle of the present application, should be comprised in the scope of the present application.

What is claimed is:

1. A method for measuring a pose of a robotic end tool, comprising:
   obtaining a three-dimensional feature of a flange for clamping the end tool and a three-dimensional feature of the end tool;
   determining a center of the flange according to the three-dimensional feature of the flange, determining a center of the end tool according to the three-dimensional feature of the end tool;
   establishing a first coordinate system and a second coordinate system based on the center of the flange and the center of the end tool acting as the origin of first coordinate system and the origin of the second coordinate system respectively;

calculating a positional offset of the origin of the second coordinate system relative to the origin of the first coordinate system;

in the first coordinate system, calculating a unit vector in a positive direction of the X-axis, a unit vector in a positive direction of the Y-axis, and a unit vector in a positive direction of the Z-axis of the second coordinate system; and collectively forming a posture transformation matrix of the second coordinate system by the unit vector of the positive direction of the X-axis, the unit vector of the positive direction of the Y-axis, and the unit vector of the positive direction of the Z-axis of the second coordinate system, and calculating a rotation offset of the second coordinate system relative to the first coordinate system by the posture transformation matrix.

2. The method of claim 1, wherein the step of calculating the positional offset of the origin of the second coordinate system relative to the origin of the first coordinate system particularly comprising:

defining the origin of the first coordinate system as $0_1$, defining the origin of the second coordinate system as $0_2$, and defining a coordinate value of $0_1$ in the first coordinate system as $(0, 0, 0)$, and defining a coordinate value of $0_2$ in the first coordinate system as $(x_0, y_0, z_0)$; and calculating the positional offset as $\Delta x = x_0$, $\Delta y = y_0$, $\Delta z = z_0$, wherein the $\Delta x$ is the positional offset of the second coordinate system relative to the first coordinate system in the X direction, the $\Delta y$ is the positional offset of the second coordinate system relative to the first coordinate system in the Y direction, and the $\Delta z$ is the positional offset of the second coordinate system relative to the first coordinate system in the Z direction.

3. The method of claim 2, wherein the step that in the first coordinate system, calculating a unit vector in a positive direction of the X-axis of the second coordinate system, a unit vector of in positive direction of the Y-axis, and a unit vector of in positive direction of the Z-axis specifically comprising:

taking points $P_1$ and $P_2$ on the X-axis and the Y-axis of the second coordinate system respectively, and defining coordinate values of $P_1$ and $P_2$ in the first coordinate system as $(x_1, y_1, z_1)$ and $(x_2, y_2, z_2)$ respectively;

calculating the vector $\overrightarrow{O_2P_1} = (x_1-x_0, y_1-y_0, z_1-z_0)$, and calculating the vector $\overrightarrow{O_2P_2} = (x_2-x_0, y_2-y_0, z_2-z_0)$;

calculating a unit vector $\vec{X}$ of the $\overrightarrow{O_2P_1}$ as $$\left( \frac{x_1 - x_0}{\sqrt{(x_1-x_0)^2 + (y_1-y_0)^2 + (z_1-z_0)^2}}, \right.$$

$$\frac{y_1 - y_0}{\sqrt{(x_1-x_0)^2 + (y_1-y_0)^2 + (z_1-z_0)^2}},$$

$$\left. \frac{z_1 - z_0}{\sqrt{(x_1-x_0)^2 + (y_1-y_0)^2 + (z_1-z_0)^2}} \right)$$

wherein the $\vec{X}$ is a unit vector of the second coordinate system in the positive direction of the X-axis;

calculating a unit vector $\vec{Y}$ of the $\overrightarrow{O_2P_2}$ as $$\left( \frac{x_2 - x_0}{\sqrt{(x_2-x_0)^2 + (y_2-y_0)^2 + (z_2-z_0)^2}}, \right.$$

$$\frac{y_2 - y_0}{\sqrt{(x_2-x_0)^2 + (y_2-y_0)^2 + (z_1-z_0)^2}},$$

$$\left. \frac{z_2 - z_0}{\sqrt{(x_1-x_0)^2 + (y_1-y_0)^2 + (z_2-z_0)^2}} \right)$$

wherein the $\vec{Y}$ is a unit vector of the second coordinate system in the positive direction of the Y-axis; and calculating a unit vector $\vec{Z}$ of the second coordinate system in the positive direction of the Z-axis as $\vec{X} \times \vec{Y}$.

4. The method of claim 1, wherein the unit vector in the positive direction of the X-axis of the second coordinate system is defined as $(a_1, b_1, c_1)$, and the unit vector in the positive direction of the Y-axis of the second coordinate system is defined as $(a_2, b_2, c_2)$, the unit vector in the positive direction of the Z-axis of the second coordinate system is defined as $(a_3, b_3, c_3)$, and the posture transformation matrix is calculated to be $$\begin{bmatrix} a_1 & a_2 & a_3 \\ b_1 & b_2 & b_3 \\ c_1 & c_2 & c_3 \end{bmatrix}.$$

5. The method of claim 4, wherein the rotation offsets are $$R_x = \tan^{-1} \frac{b_1}{a_1}, \quad R_y = \tan^{-1} \frac{-c_1}{\sqrt{a_1^2 + b_1^2}}, \quad R_z = \tan^{-1} \frac{c_2}{c_3},$$

wherein the $R_x$ is a rotational offset of the second coordinate system relative to the first coordinate system on the X-axis, and the $R_y$ is a rotational offset of the second coordinate system relative to the first coordinate system on the Y-axis, the $R_z$ is a rotational offset of the second coordinate system relative to the first coordinate system on the Z-axis.

6. The method of claim 1, wherein the three-dimensional features of the flange and the end tool are obtained by a binocular three-dimensional scanner.

* * * * *